(12) United States Patent
Kuang (10) Patent No.: US 10,776,615 B2
(45) Date of Patent: Sep. 15, 2020

(54) SYSTEM AND METHOD OF SOCIAL NETWORKS FOR DOGS OR OTHER PETS

(71) Applicant: Shaobo Kuang, Lansdale, PA (US)

(72) Inventor: Shaobo Kuang, Lansdale, PA (US)

( * ) Notice: Subject to any disclaimer, the term of this patent is extended or adjusted under 35 U.S.C. 154(b) by 447 days.

(21) Appl. No.: 15/863,919

(22) Filed: Jan. 6, 2018

(65) Prior Publication Data
US 2019/0213401 A1    Jul. 11, 2019

(51) Int. Cl.
| | | |
|---|---|---|
| *G06K 9/00* | (2006.01) | |
| *G10L 25/87* | (2013.01) | |
| *H04N 21/466* | (2011.01) | |
| *A01K 15/02* | (2006.01) | |
| *A01K 29/00* | (2006.01) | |
| *G06Q 50/00* | (2012.01) | |
| *G06N 20/00* | (2019.01) | |
| *G10L 17/26* | (2013.01) | |
| *G10L 25/63* | (2013.01) | |
| *G10L 25/90* | (2013.01) | |

(52) U.S. Cl.
CPC ........ *G06K 9/00335* (2013.01); *A01K 15/021* (2013.01); *A01K 29/005* (2013.01); *G06K 9/00302* (2013.01); *G06N 20/00* (2019.01); *G06Q 50/01* (2013.01); *G10L 17/26* (2013.01); *G10L 25/63* (2013.01); *G10L 25/87* (2013.01); *H04N 21/4668* (2013.01); *G10L 2025/906* (2013.01)

(58) Field of Classification Search
CPC combination set(s) only.
See application file for complete search history.

(56) References Cited

U.S. PATENT DOCUMENTS

| | | | |
|---|---|---|---|
| 10,149,617 B2* | 12/2018 | Couse | ........... A61B 5/7275 |
| 2011/0215935 A1* | 9/2011 | Zehavi | ........... A01K 15/021 340/573.3 |

* cited by examiner

*Primary Examiner* — Travis R Hunnings (57) ABSTRACT

A social network system for pets comprises a sensor for detecting or collecting a pet's voices or body signals, a translation unit for comparing the detected pet's voices or body signals with the stored sample patterns, determining the pet's emotions or feelings by choosing one or many sample patterns which are most closely matched to the detected pet's voices or body signals, and a processing unit for performing one or many actions based on the determined pet's emotions or feelings.

19 Claims, 11 Drawing Sheets

100 Dog social networking system

| Dog's voices and boy signals | Dog's emotions or feelings |
|---|---|
| continuous rapid barking | potential problem |
| Barking in rapid with a few pauses | may be a problem |
| Prolonged or incessant barking | Is there anybody there? |
| One or two sharp short barks | Hello there! |
| Lower range single sharp short bark | Stop that! |
| High range single sharp short bark | What's this? |
| Series of yelps | severe fear and pain |
| High-pitched barks | anxiety or stress |
| Short, repetitious barks | excited and happy |
| Low, intermittent barks | aggression and dissatisfaction |
| Isolated, monotonous barks | dog wants to draw attention |
| Licking | say hello |
| Raised eyebrows | curiosity and interest |
| Lowered eyebrows | dissatisfaction |
| Tilting the head | curiosity |
| Feet stomping | extreme excitement |
| Howl | Stay away |
| Yelp | That scared me! |
| Growl | Please stop doing that |
| Whine | I need something |
| raised tail | alertness |

Fig 3

| Cat's meows and body signals | Cat's emotions or feelings |
|---|---|
| Short meow | Hey, how are you doing |
| Multiple meows | I'm so happy to see you! |
| I'm so happy to see you! | A plea for something |
| Drawn-out | I want dinner NOW! |
| Low pitched mraaooww | complaint |
| Purr | contentedness |
| Hiss | I'm angry |

| Dog's voices and boy signals | Dog's attitude scales |
|---|---|
| continuous rapid barking | dislike very much |
| Barking in rapid with a few pauses | dislike |
| Short, repetitious barks | like |
| Low, intermittent barks | dislike very much |
| Raised eyebrows | neutral |
| Lowered eyebrows | dislike |
| Feet stomping | Like very much |

SYSTEM AND METHOD OF SOCIAL NETWORKS FOR DOGS OR OTHER PETS

FIELD OF THE INVENTION

The present invention relates to social networking technology, more particularly a system and method for social networks for dogs or other pets or species.

BACKGROUND OF THE INVENTION

Social networks are the practice of expanding the number of one's business and or social contacts by making connections through individuals, often through social media sites or other social contact tools. The well-known social media sites are Facebook, Twitter, LinkedIn, WeChat and Google+. All those social media sites are connecting people through social network structure. Depending on the social media platform, persons are able to contact any other persons. According to the recent researches, 55% of people use social media to stay in touch with what friends are doing.

A number of studies of criminals have confirmed that dogs are an effective deterrent to burglary.

Animals, specially, dogs, in some extend, are able to communicate with people. Actually, dogs are incredibly social animals with an arsenal of communication skills that can rival even those of humans. Just as we can form sentences and change the pitch of our voice to mean different things, so can a dog change her bark depending on what she is trying to tell you. Barking is natural and almost all dogs bark. Barking is one of the many ways dogs communicate with each other as well as with humans. Dogs communicate using a complex language of body signals (gestures or actions) that reflect what they are thinking and feeling.

The use of advanced machine learning algorithms to classify and analyze animal sounds opens new perspectives for the understanding of animal communication.

SUMMARY OF THE INVENTION

It is, therefore, the objects of the present invention are intended to overcome the drawbacks of the conventional art.

Accordingly, an object of the present invention is to provide a method and a system for a social network for dogs and other pets or species.

Another object of the present invention is to provide a method and a system for helping dogs and other pets or species to contact with each other.

Another object of the present invention is to provide a method and a system for helping dogs and other pets or species to contact with their owners.

Another object of the present invention is to provide a method and a system for helping the owners of dogs and other pets to contact with each other.

Another object of the present invention is to provide a method and a system of allowing dogs or other pets to learn to contact each other through a dog social network.

Another object of the present invention is to provide a method and a system of allowing dogs or other pets to learn to contact their owners through a dog social network Another object of the present invention is to provide a method and a system of allowing dogs to live bark to other dogs.

Another object of the present invention is to provide a method and a system of allowing dogs and other pets to contact with their owners.

Another object of the present invention is to provide a method and system of allowing dogs' owners to contact with each other.

Further objects and advantages of our invention will become apparent from a consideration of the drawings and ensuring descriptions.

A social network system for pets according to the present invention comprises:
  means for detecting or collecting a pet's voices or body signals;
  means for translating or determining the detected voices or body signals into one or many emotions or feelings of the pet; and
  means for performing one or many actions based on the determined pet's emotions or feelings.

The social network system according to the present invention further comprises:
  means for storing one or many sample patterns of pets' voices or pets' body signals and the corresponding pets' emotions or feelings; and
  means for comparing the detected pet's voices or body signals with the stored sample patterns and determining the pet's emotions or feelings by choosing one or many sample patterns which are most closely matched to the detected pet's voices or body signals.

A method of a social networking for pets according to the present invention comprises:
  displaying or showing a pet of pictures or videos of other pets;
  detecting or collecting the pets' voices or body signals;
  comparing the detected voices or body signals of the pet with the stored sample patterns and determining or measuring the pet's scales of the attitude toward the other pets in the pictures or videos;
  displaying or showing the pet more pictures or videos of the other pets if the determined attitude scales are positive.

The present invention is described in the detail below, together with its further objectives, features, and advantages, in conjunction with the following drawings:

DETAILED DESCRIPTION OF THE INVENTION

Reference will now be made in detail to the preferred embodiments of the present invention, a method and system of social networks for dogs, other pets and their owners, examples of which are illustrated in the accompanying drawings.

Figure 1:
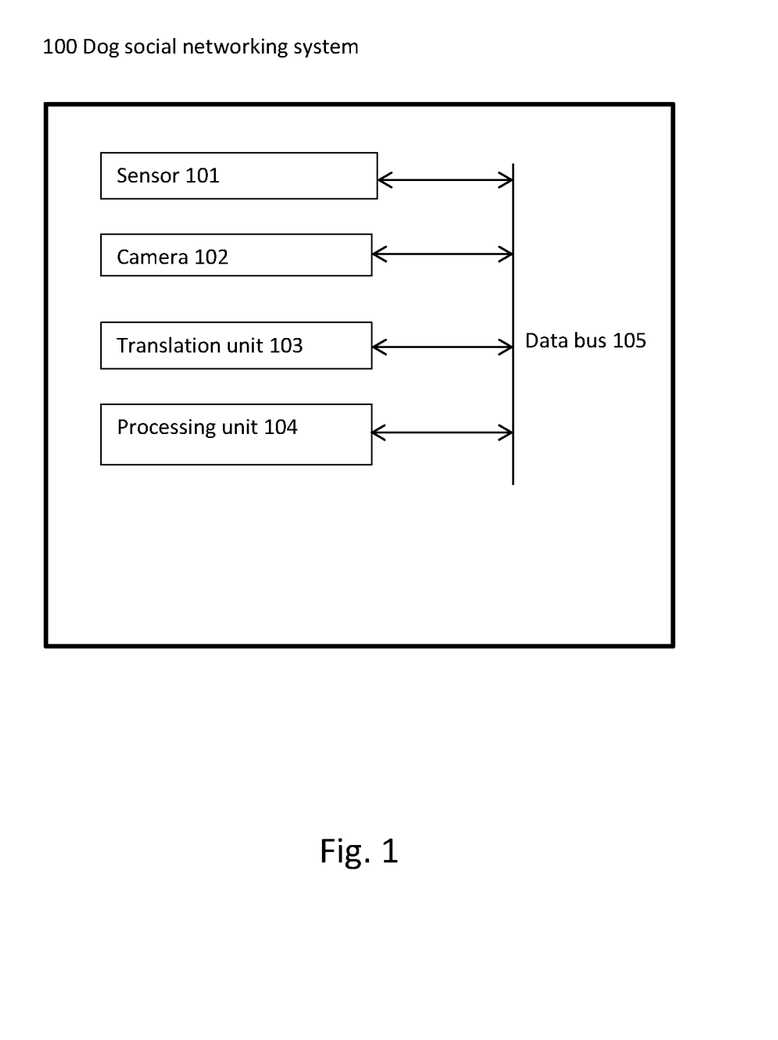
FIG. 1 is a schematic drawing showing an example of a dog social networking system in accordance with the present invention.

Referring now to the drawings, FIG. 1 shows a dog social networking system in accordance with the present invention. In this embodiment, a dog social networking system 100 comprises a sensor 101 for detecting and collecting dogs' voices or body signals, a camera 102 for monitoring the areas nearby or around the dogs, a translation unit 103 for translating or determining the detected voices or body signals into dogs' emotions or feelings, and a processing unit 104 for, based on the determined dogs' emotions or feelings, performing one or many actions. In this embodiment, the sensor 101, the camera 102, the translation unit 103 and the processing unit 104 are connected to each other through a data bus 105. In other cases, the sensor 101 and the camera 102 can be wirelessly connected to other units.

In other embodiments, advanced digital wireless technology, such as Wi-Fi, Bluetooth, Zigbee, and Z-Wave, could be applied to connect the sensor 101, and camera 102 to other units. It eliminates the need of the video or other connection cables and allowing hassle-free installation. In other embodiments, the above units use advanced digital wireless technology, such as Wi-Fi, Bluetooth, Zigbee, and Z-Wave, to connect to each other.

The sensor 101 can be mounted to a dog or nearby a dog. The camera 102 can be mounted around houses or buildings. The camera 102 can be also mounted to a dog or near by a dog to capture the world from the dog's point of view. Three possible mounting locations (head, back, and chest) enable a variety of perspectives. Comparing with normally mounting cameras in fixed locations around houses or buildings, the present invention's embodiment covers a much bigger area for monitoring.

Figure 2:
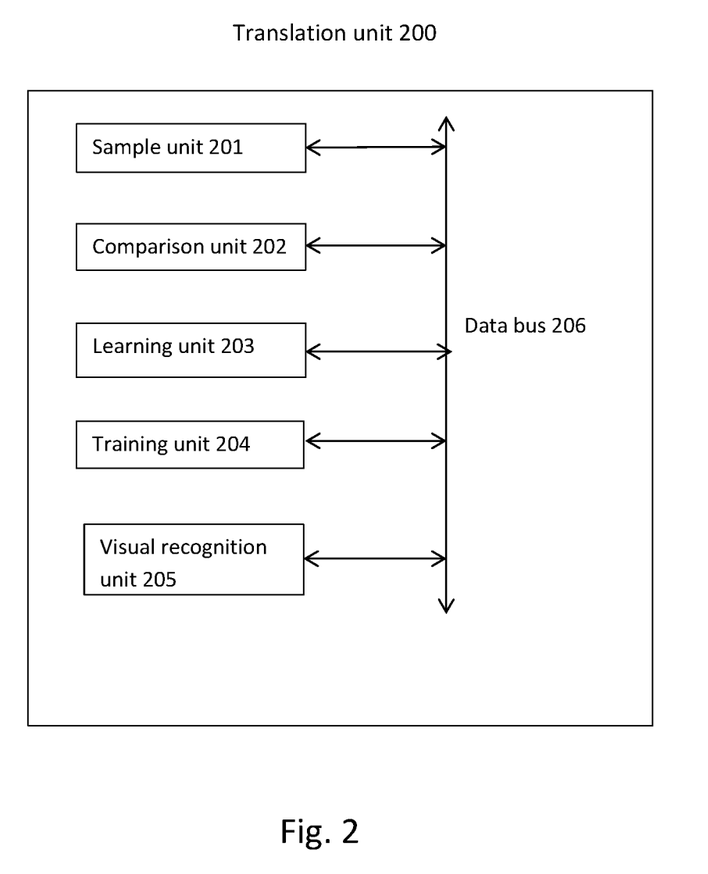
FIG. 2 is a schematic drawing showing the translation unit in detail according to the present invention in detail.

FIG. 2 shows the translation unit 103 in detail. The translation unit 200 (the translation unit 103 in FIG. 1) comprises a sample unit 201 for storing one or many sample patterns of dogs' voices or dogs' body signals and the corresponding dogs emotions or feelings, a comparison unit 202 for comparing the detected voices or body signals of a dog with the stored sample patterns and determining the dog's emotions and feelings by choosing one or many sample patterns which are most closely matched to the detected dog's voices or body signals, a learning unit 203 for learning dogs' voices or body signals, collecting samples of dogs' voices or body signals, and associating one or many dogs' emotions or feelings to the collected samples by using machine learning or other technologies or methodologies, a training unit 204 for training dogs to use voices or body signals to convey their emotions and feelings, and a visual recognition unit 205 for analyzing pictures or videos to understand or determine the contents of the pictures or videos that are captured by the camera 102. The visual recognition unit 205 may use deep learning or other technologies to analyze images or videos to obtain and understand the contents of the images or videos that are captured by the camera 102. The dogs' voices can be barking, howling, whining, yelping, and growling.

In use, the sensor 101 detects and collects the voices of a dog, and passes or forwards the collected the voices signals to the translation unit 103. The camera 102 captures the pictures or videos before, during or after the time of dog's barking. The translation unit 103 translates the detected voices or body signals into dogs' emotions or feelings. The visual recognition unit 205 analyzes the images, pictures or videos to understand or determine the contents of the images, pictures or videos that are captured by the camera 102. The processing unit 104, based on the determined dogs' emotions or feelings, and the contents of the pictures or videos, performs one or many actions. For example, if the dogs' emotions or feelings are angry or scare, the processing unit 104 may send an emergency or important email or message to the dogs' owners or other agencies. If the determined dogs' emotions or feelings are scare, and the determined contents of is "fire", the processing unit 104 will send an emergency or important email or message to the dog's owners and also make an emergency call to the local fire department or the local police office.

In translation unit 200 (translation unit 103 in FIG. 1), the comparison unit 202 compares the detected voices or body signals of a dog with the stored sample patterns and chooses or selects one or many sample patterns, which are most closely matched to the detected dogs' voices or body signals, to determine the dog's emotions and feelings based on the emotions and feelings associated with the selected one or many sample patterns. The visual recognition unit 205 uses deep learning or other technologies to analyze images or videos to obtain, understand or determine the contents of the images or videos, which are captured by the camera 102 at the time before, during, or after the time of dog's barking.

In this embodiment, the units 201, 202, 203, 204, and 205 are connected through data bus 206. In other embodiments, advanced digital wireless technology, such as Wi-Fi, Bluetooth, Zigbee, and Z-Wave, could be applied to connect these units.

Although, in FIGS. 1 and 2, the embodiment of the present invention shows a social network system for dogs, the social network system can also be applied to cats, birds or other pets. In a social network system of cats, the sensor 101 will detect cats' meows or cats' body signals, and the translator 103 will translate cats' meows or cats' body signals into natural language sentences or machine understandable codes.

Figure 3:
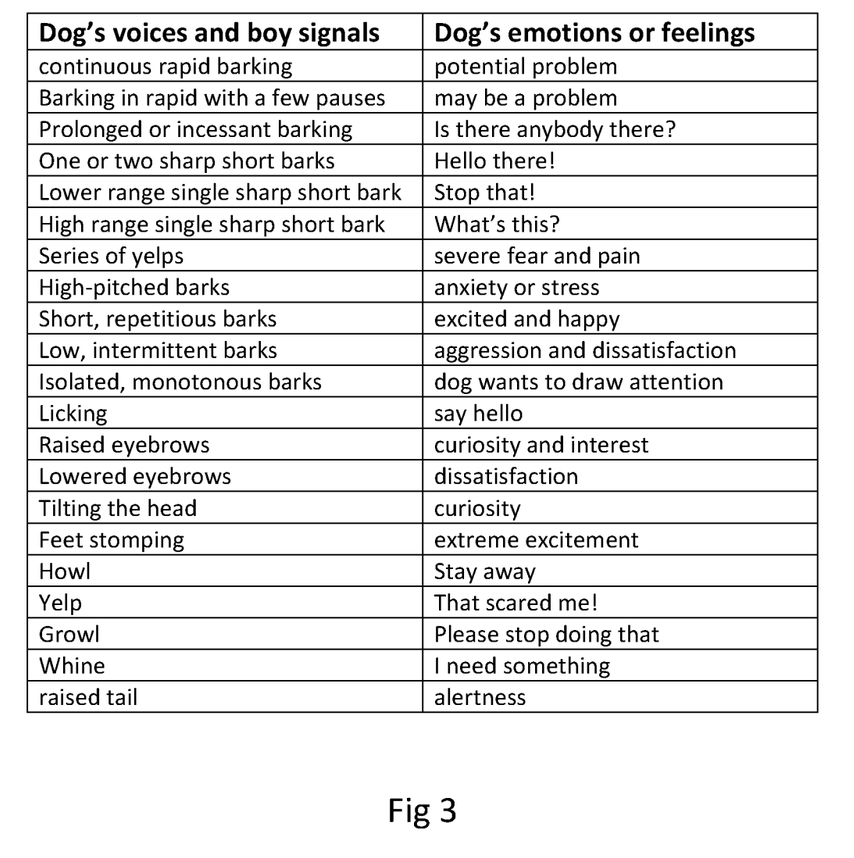
FIG. 3 depicts a sample data table containing the information of dogs' voices, dogs' body signals, and the corresponding dogs' emotions or feelings.

FIG. 3 depicts samples of the reference voices or body signals patterns that are stored in a table of dogs' emotions or feelings based reference patterns. The left column contains dogs' voices and dogs' body signals patterns while the right column contains the corresponding dogs' emotions or feelings. The patterns of dogs' voices and body signals can be stored in the table in digital modes. In this case, the sensor 101 obtains or collects a pattern of a dog's voices or body signals. The comparison unit 202 compares the collected pattern with the patterns in the sample unit 201, and determines the dog's emotions and feelings by choosing the patterns most closely matched to the detected the dog's voices or body signals. The processing unit 104, based on the determined dogs' emotions or feelings, performs one or many actions.

Figure 4:
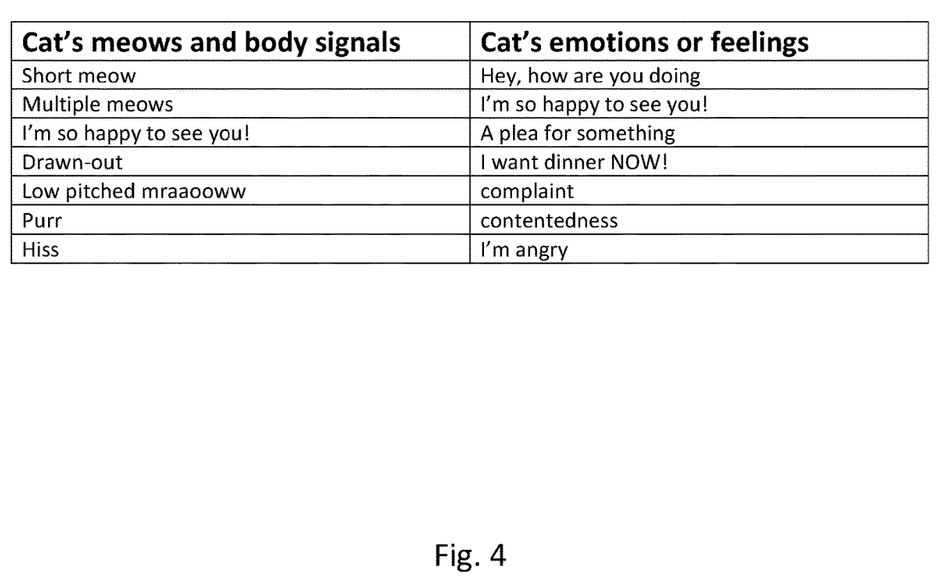
FIG. 4 depicts a sample data table containing the information of cats' voices, cats' body signals and the corresponding cats; emotions or feelings.

FIG. 4 depicts samples of the reference voice or body signal patterns that are stored in a table of cats' emotions or feelings based reference patterns. The left column contains cats' voices and cats' body signals patterns while the right column contains the corresponding cats' emotions or feelings. The patterns of cats' voices and body signals can be stored in the table in digital modes. In this case, the sensor 101 obtains or collects a pattern of a cat's voices or body signals. The comparison unit 202 compares the collected pattern with the patterns in the sample unit 201, and determines the cat's emotions and feelings by choosing the patterns most closely matched to the detected cat's voices or body signals. The processing unit 104, based on the determined cats' emotions or feelings, proceeds or performs one or many actions.

Figure 5:
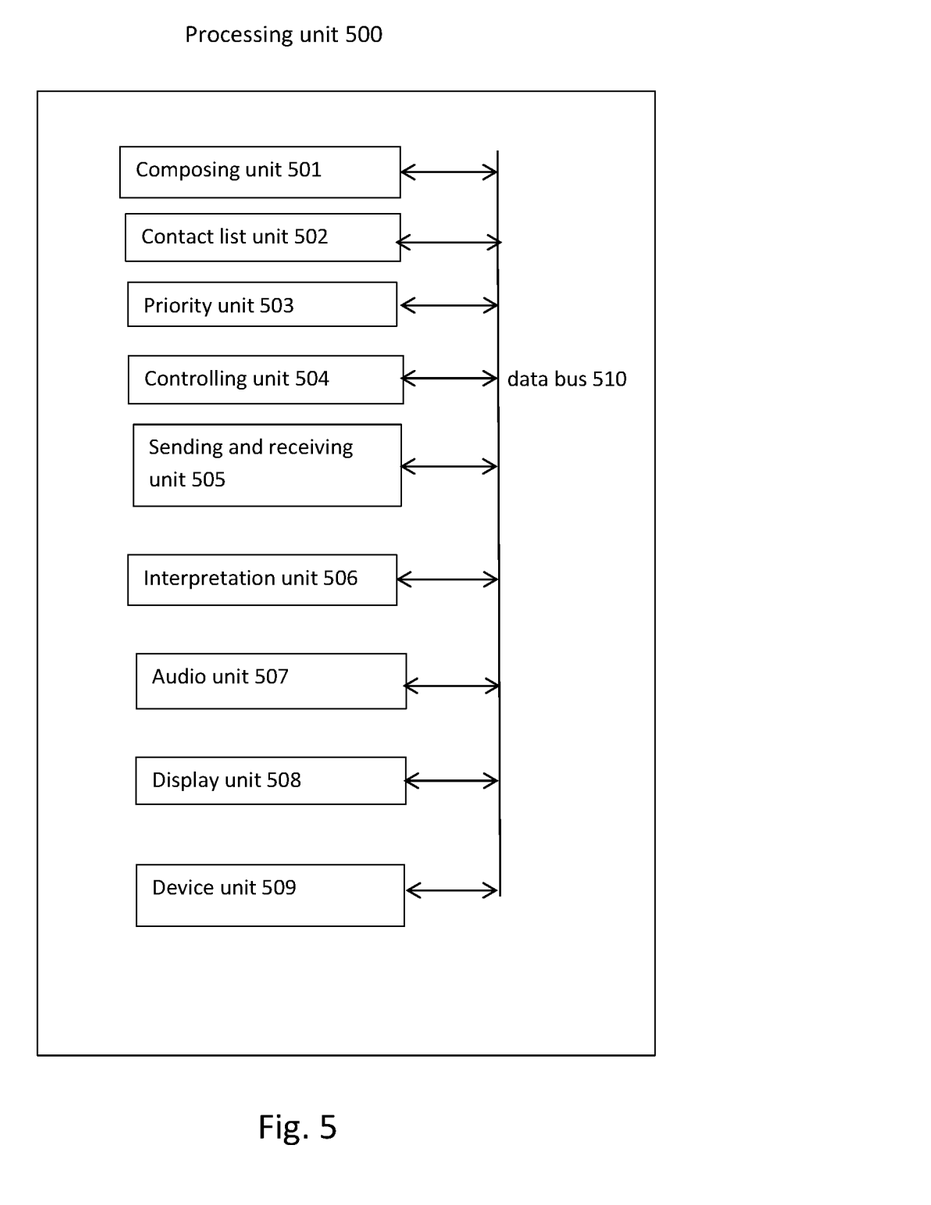
FIG. 5 is a schematic drawing showing the processing unit in detail according to the present invention.

FIG. 5 shows the processing unit 104 in detail. The processing unit 500 (the processing unit 104 in FIG. 1) comprises a composing unit 501 for composing one or many messages, emails or graphics based on the determined or translated dogs' emotions or feelings, a social contact list unit 502 for storing one or many screen names that that represent other dogs or people, a priority unit 503 for setting priority levels to the composed messages or emails based on the determined or translated dogs' emotions or feelings, a controlling unit 504 for sending one or many controlling signals to one or many devices based on the translated dogs' emotions or feelings, a sending and receiving unit 505 for sending the messages, emails or controlling signals or for receiving messages, emails or controlling signals from other persons or dogs, an interpretation unit 506 for interpreting the received messages, emails and controlling signals into voices' commands or image commands that can be understood by dogs, an audio unit 507 for playing the interpreted voice commands, a display unit 508 for displaying the interpreted image commands which can be understood by dogs, and a device unit 509 for controlling one or many devices to perform one or many actions based on the translated dogs' emotions or feelings.

The composing unit 501 for composing one or many messages or emails in English or other natural languages based on the translated dogs' emotions, the translated dogs' feelings or the contents obtained by the visual recognition unit 205. The device unit 509 comprises one or many devices, such one of many light bulbs. For example, the device unit 509 controls the light bulbs based on a dog's barks. For example, the device unit 509 turns on the light bulbs based on the number of a dog's barks. For example, the device unit 509 turns on 3 light bulbs when a dog barks 3 times. In another example, the device unit 509 can be a Christmas tree with lights in different shapes, such as string lights, fairy lights, circle lights, star lights and etc. The device unit 509 controls the shapes, counts or colors of light bulbs based on the determined dogs' emotions or feelings.

In this embodiment, the composing unit 501, the contact list unit 502, the priority unit 503, the controlling unit 504, the sending and receiving unit 505, the interpretation unit 506, the audio unit 507 and the display unit 508 are connected through data bus 510. In other embodiments, these units can be connected to each other through wireless or other technologies.

The composing unit 501, based on the translated dogs' emotions or feelings, composes one or many messages or emails in English or other languages. The composing unit 501 also adds the attachments of dogs' voices, videos or pictures into the messages or emails. The contact list unit 502 further comprises a relation unit for setting the relationship between dogs and their owners. The contact list unit 502 further comprises an associating unit for allowing users, who are most likely dogs' owners, to associate the types of the messages and the emails or the types of the dogs' emotions and the feelings to the types of the persons in the contact list. For example, it associates a continuous rapid barking, which means dogs got problems, to dogs' owners and police offices. The composing unit 501 can also compose one or many messages or emails in English or other languages based on the images or videos contents, which are obtained or determined from the visual recognition unit 205.

Figure 6:
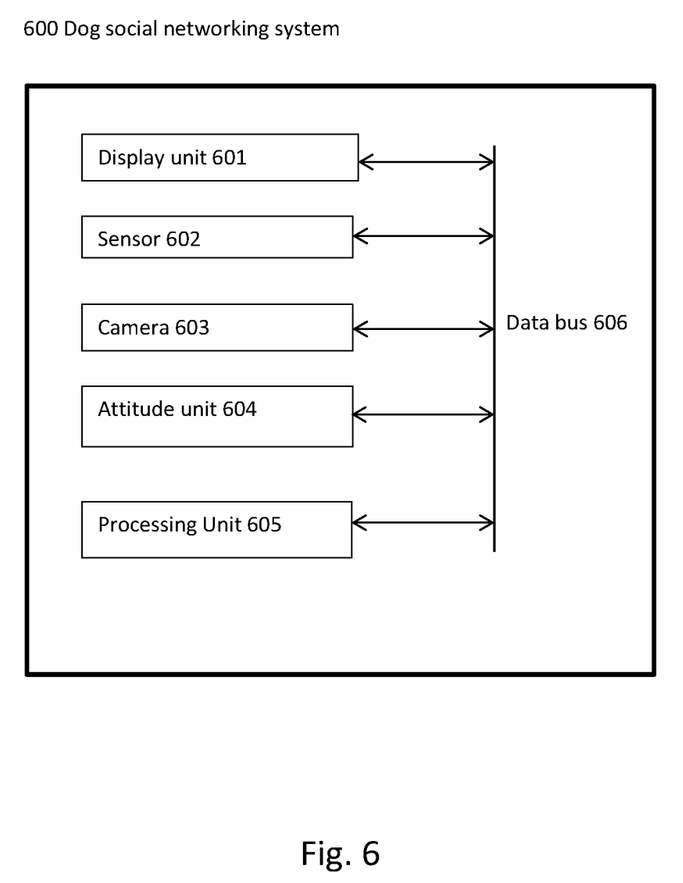
FIG. 6 is a schematic drawing showing another example of a dog social networking system in accordance with the present invention.

FIG. 6 shows another dog social networking system in accordance with the present invention. In this embodiment, a social networking system 600 for a dog comprises a display unit 601 for displaying or showing pictures or videos of one or many items, a sensor 602 for detecting and collecting the dog's voices or body signals, a camera 603 for monitoring the dog and taking pictures or videos of the dog, an attitude unit 604 for, based on the detected voices or body signals or other facts or conditions, determining the dog's attitude to said items, and a processing unit 606 for, based on the obtained or determined the dog's attitude, proceeding to or performing one or many actions.

In this embodiment, the display unit 601, the sensor 602, the camera 603, the attitude unit 604 and the processing unit 605 are connected to each other through a data bus 606. In other cases, these units can be connected to each other through wireless or other technologies.

In this embodiment, the display unit 601 displays or shows a picture or video of one or many items, which can be dogs, which more likely are other dogs, other animals, buildings, flowers or other objects. The sensor 602 detects the dog's voices or body signals when the dog responses to the items in the picture or video. The attitude unit 604 determines the dog's attitude toward the items displayed or showed in the picture or video. The processing unit 605, based on the determined the dog's attitude, performs one or many actions.

The dogs' attitudes have two important aspects, direction (positive/negative, like or dislike) and intensity (strength of feeling). For example, if a dog likes other dog's pictures very much, his positive attitude toward the pictures has a high level of intensity. The dogs' attitude scales can be "like very much", "like", "neutral", "dislike" and "dislike very much", or can be simply "like", "neutral", and "dislike".

For example, the display unit 601 displays or shows a picture or video of a Shetland Sheepdog to a Labrador Retriever. The sensor 602 detects the barks and the body signals of the Labrador Retriever when she responses to the picture or video of the Shetland Sheepdog. The attitude unit 604 determines or measuring the Labrador Retriever's attitude scales toward the Shetland Sheepdog dog. If the determined or measured a dispositional attitude scale is "like very much", then the processing unit 605, based on the determined or measured attitude scales and other conditions proceeds to display or show more pictures or videos about the Shetland Sheepdog dog to the Labrador Retriever dog, or even sends a greeting message to the Shetland Sheepdog or his owners. if the attitude unit 604 determines a positive dispositional attitude of the dog to the items, which are pictures of one or many other dogs, the processing unit may display more pictures about the other dogs or send a greeting or invitation message to the other dogs or their owners. if the attitude unit 604 determines a negative attitude of the dog to an item, the processing unit will skip and not display the pictures about this item.

Figure 7:
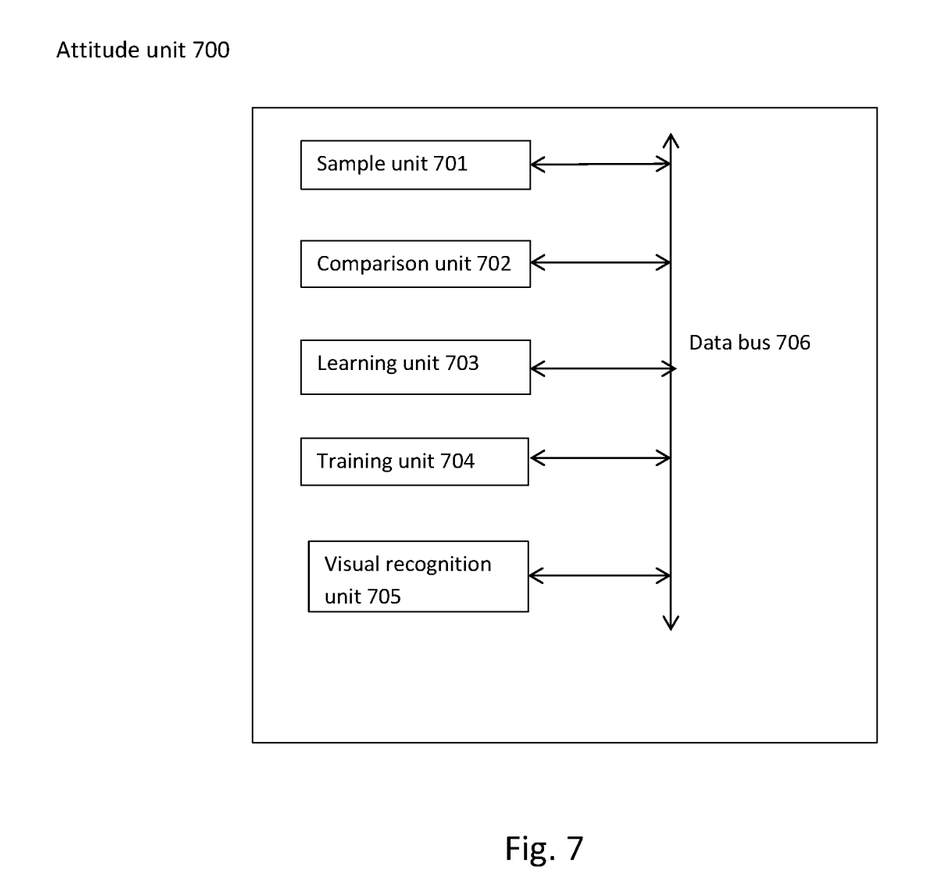
FIG. 7 is a schematic drawing showing the attitude unit in detail according to the present invention.

FIG. 7 shows the attitude unit 604 in detail. The attitude unit 700 (the attitude unit 604 in FIG. 6) comprises a sample unit 701 for storing one or many sample patterns of dogs' voices or dogs' body signals and the corresponding dogs' attitude scales, a comparison unit 702 for comparing the detected voices or body signals of a dog with the stored sample patterns and determining or measuring the dog's attitude scales by choosing one or many sample patterns which are most closely matched to the detected dog's voices or body signals, a learning unit 703 for learning dogs' voices or body signals, collecting samples of dogs' voices or body signals, and associating one or many dogs' attitude scales to the collected samples by using machine learning or other technologies or methodologies, a training unit 704 for training dogs to use voices or body signals to convey their attitudes, and a visual recognition unit 705 for analyzing pictures or videos to understand the contents of the pictures or videos that are captured by the camera 603 and the contents displayed or played in the display unit 601. The visual recognition unit 705 may use deep learning or other technologies to analyze the pictures or videos in both camera 603 and the display unit 601. The comparison unit 702 compares the detected voices or body signals of a dog with the stored sample patterns and determines the dog's attitude scales by choosing one or many sample patterns which are most closely matched to the detected dog's voices or body signals. The comparison unit 702 also takes into account the contents obtained from the visual recognition unit 705 when it compares the detected voices or body signals of a dog with the stored samples.

Figure 8:
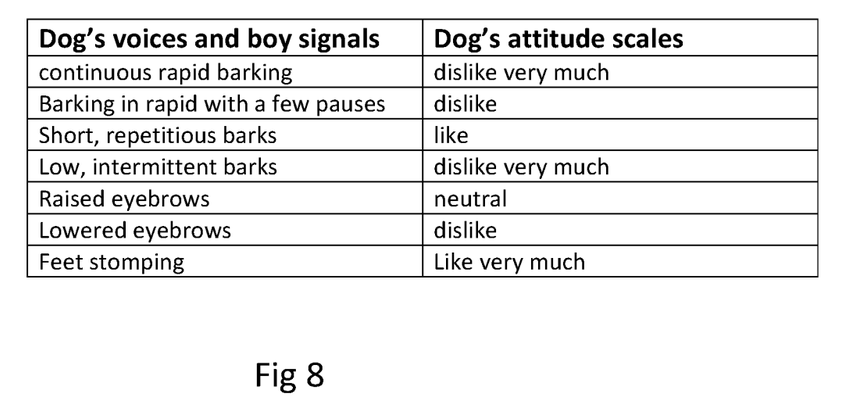
FIG. 8 depicts a sample data table containing the information of dogs' voices, dogs' body signals and the corresponding dogs' attitude scales.

FIG. 8 depicts samples of the reference voices or body signals patterns that are stored in dogs' attitude scales based reference patterns table. The left column contains dogs' voices and dogs' body signals patterns while the right column contains the corresponding dogs' attitude scales. The patterns of dogs' voices and body signals can be stored in the table in digital modes. In this case, the sensor 602 obtains or collects a pattern of a dog's voices or body signals. The comparison unit 702 compares the collected pattern with the patterns in the sample unit 701, determines the dog's scales by choosing the patterns most closely matched to the detected the dog's voices or body signals. The processing unit 606, based on the determined dogs' attitude scales, performs one or many actions.

Figure 9:
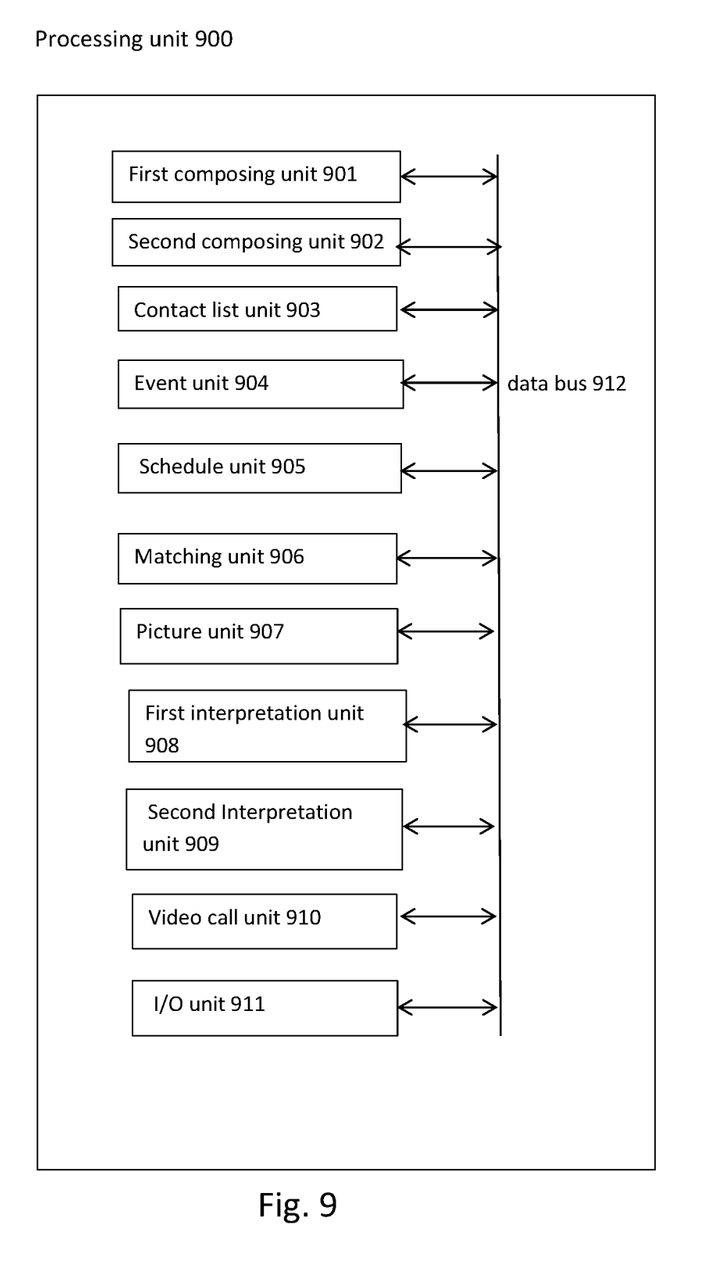
FIG. 9 is a schematic drawing showing the processing unit in detail according to the present invention.

FIG. 9 shows the processing unit 605 in detail. The processing unit 900 (the processing unit 605 in FIG. 6) comprises a first composing unit 901 for composing one or many graphics, videos, or animation videos, which can be understood by dogs, based on the translated or determined dogs' emotions or feelings or attitude scales, a second composing unit 902 for composing one or many texts or voice messages in a natural language based on the translated or determined dogs' emotions or feelings or attitude scales, a social contact list unit 903 for storing one or many screen names that represent other dogs or people, an event unit 904 for finding or obtaining one or many events that may be interesting to dogs and showing the pictures or videos of the events to the dogs, a schedule unit 905 for scheduling one or many events that the dogs are interested in based on the dogs' attitudes toward the pictures or videos of the events, a matching unit 906 for finding one or many matched dogs to have a video bark or call from dog social networks, a picture unit 907 for selecting or editing one or many pictures taken by the camera 603 and sharing the pictures with other dogs, their owners and other people, an I/O unit 911 for sending or receiving messages, pictures, emails, videos, text, voices, and other signals, a first interpretation unit 908 for interpreting the received messages, emails and controlling signals into voices' commands or image commands which can be understood by dogs, a second interpretation unit 909 for interpreting and translating dogs' barks and their body signals into natural languages which can be understood by dogs' owners, and a video call unit 909 for allowing dogs and their owners to video call one or many other dogs and their owners.

In this embodiment, the units 901-911 are connect to each other through data bus 912. The units can also be connected to each other by using wireless or other technologies.

In this embodiment, the display unit 601 displays or shows a picture or video of the birthday party of a Shetland Sheepdog to a Labrador Retriever. The sensor 602 detects the barks and the body signals of the Labrador Retriever when she responses to the picture or video of the Shetland Sheepdog's birthday party. The attitude unit 604 determines or measuring the Labrador Retriever's attitude scales toward the Shetland Sheepdog's birthday party. If the determined or measured a dispositional attitude scale is "like very much", then the schedule unit 905 schedules or books a video call event to join the Shetland Sheepdog's birthday party on Labrador Retriever's calendar or on his owner's calendar based on the determined or measured attitude scales and other facts or conditions. On the Shetland Sheepdog's birthday, the Labrador Retriever joins the Shetland Sheepdogs' birthday party through the video call unit 909.

Figure 10:
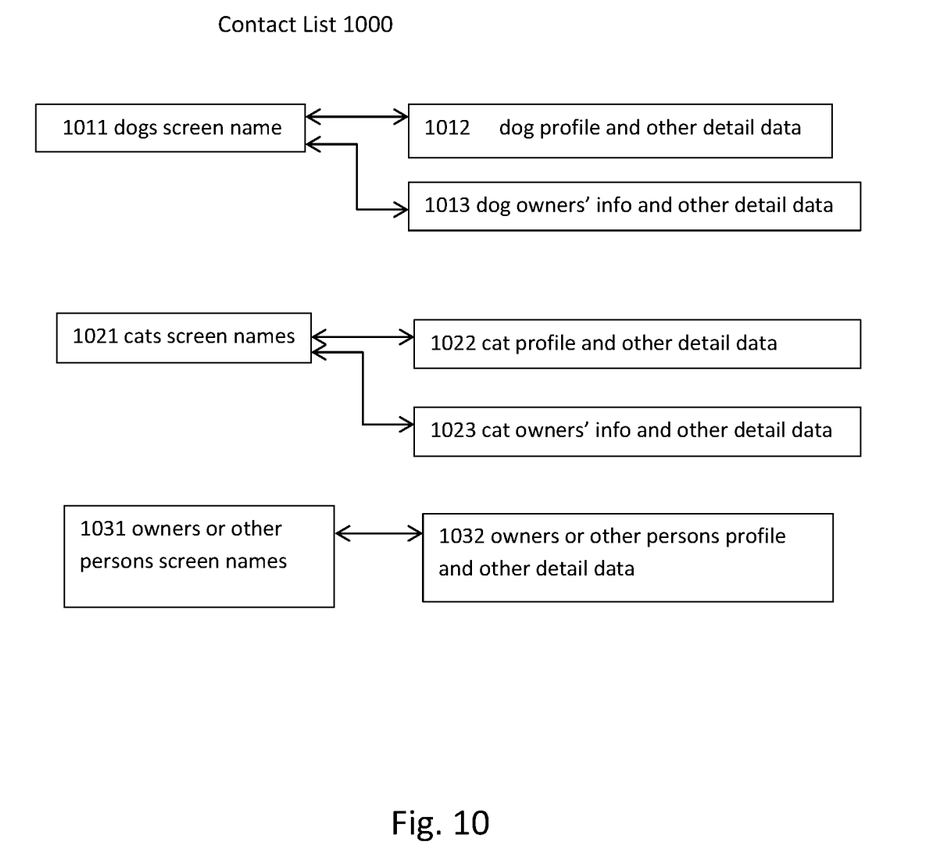
FIG. 10 is a schematic drawing showing the contact list according to the present invention.

FIG. 10 shows the contact list according to the present invention. The contact list 1000 comprises a set of contacts with nicknames or screen names (1011, 1021, and 1031) that represent real dogs, cats, their owners or other people. For each contact, there is a field for assigning or setting a species type that the current contact belongs to. For a contact with a species type "dog", the contact comprises the fields of dog name, dog gender, dog birthday, dog type, dog color, one or many the dog owner's screen names or email addresses. For a contact with a species type "cat", the contact comprises fields of cat name, cat gender, cat birthday, cat type, cat color, one or many the cat owner's screen name or email addresses. In this embodiment, each contact with a species type "dog" directly includes one or many fields referring to dogs' owners. In another embodiment, there is a reference or relation table having relationships between dogs and their owners. In another word, each contact with a species type "dog" have one or many indirect references to their owners. In a contact list, when a dog contact is selected, it will search from the reference or relation table and find out his or her owners, and display the owners' screen names in the contact list. For a contact with a species type "human" in a contact list, there are one or many indirect references to their pets. In a contact list, when a contact with a species type "human" is selected, it will search from the reference or relation table and find out his or her pets, and display the pets' screen names in the contact list. In a contact list, when a species type "dog" is selected, it will show or list all the contacts with species type "dog".

In another embodiment of the present invention, for a dog, there is a chip ID card, which is capable of communicating with other cards and exchanging dogs social network screen names or IDs and exchanging dogs owners social network screen name, IDs or email addresses.

Figure 11:
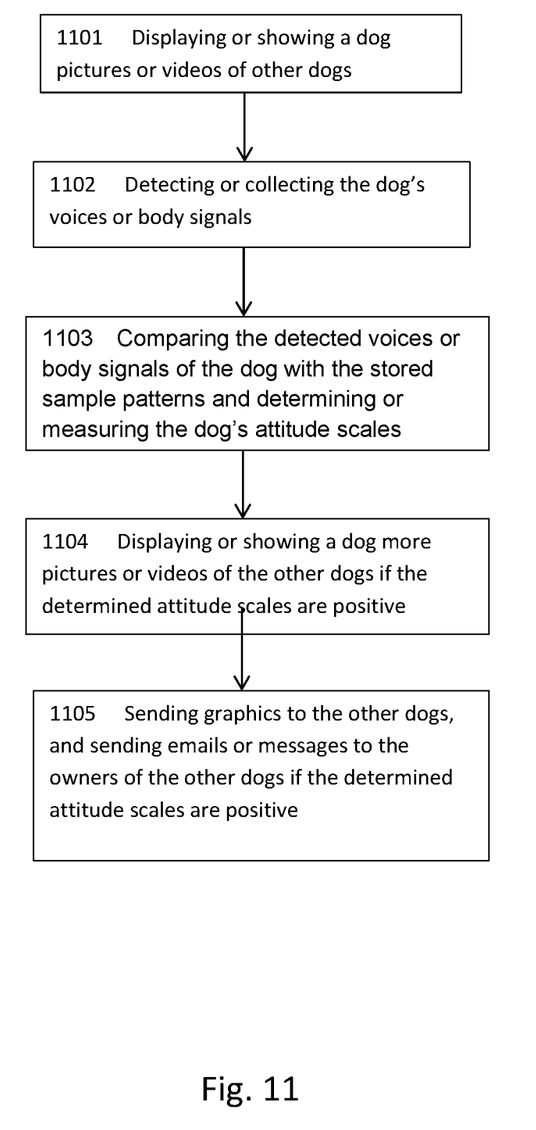
FIG. 11 is a flow chart illustrating a method of dog social networks of the present invention.

FIG. 11 illustrates a method of dog social networks. At 1101, the present embodiment displays or shows a dog pictures or videos of other dogs. At 1102, the present embodiment detects or collects the dog's voices or body signals. At 1103, the present embodiment compares the detected voices or body signals of the dog with the stored sample patterns and determining or measuring the scales of the dog's attitude toward the pictures or videos of the other dogs. At 1104, the present embodiment displays or shows the dog more pictures or videos of the other dogs if the determined attitude scales are positive. At 1105, the present embodiment sends graphics to the other dogs, and sends emails or messages to the owners of the other dogs if the determined attitude scales are positive.

Although the invention has been described with reference to the above-described embodiments and examples, it will be appreciated that many other variations, modifications, and applications may be devised in accordance with the broad principles of the invention disclosed herein. The invention, including the described embodiments and examples and all related variations, modifications and applications is defined in the following claims.

Therefore, the forgoing is considered as illustrative only of the principles of the invention. Furthermore, since numerous modifications and changes will readily occur to those skilled in the art, it is not desired to limit the invention to the exact construction and operation shown and described. Accordingly, all suitable modifications and equivalents may be resorted to, falling within the scope of the invention.

The invention claimed is:

1. A social network system for pets according to the present invention comprising:
   means for detecting or collecting a pet's voices or body signals;
   means for translating or determining the detected voices or body signals into one or many pet's emotions or feelings;
   means for storing one or many sample patterns of pets' voices or pets' body signals and the corresponding pets' emotions or feelings;
   means for comparing the detected pet's voices or body signals with the stored sample patterns and determining the pet's emotions or feelings by choosing one or many sample patterns which are most closely matched to the detected pet's voices or body signals;
   a camera for monitoring the areas nearby or around the pet;
   means for analyzing pictures or videos captured by the camera to understand or determine the contents of the pictures or videos; and
   means for performing one or many actions based on the determined pet's emotions or feelings and the contents of the pictures or videos.

2. The system of claim 1 further comprising:
   means for sending the messages, emails or controlling signals to other people or pets, or for receiving messages, emails or controlling signals from other people or pets;
   means for interpreting the received messages, emails and controlling signals into voices' commands or image commands that can be understood by the pet;
   means for playing the interpreted voice commands that can be understood by the pet;
   means for displaying the interpreted image commands that can be understood by the pet;
   means for controlling one or many devices to perform one or many actions based on the determined or translated pet's emotions or feelings.

3. The system of claim 2 further comprising:
   a contact list for storing one or many screen names that represent other pets, the owners of the pets, or other people;
   means for composing one or many messages, emails or graphics based on the determined pets' emotions or feelings;
   means for setting priority levels to the composed messages or emails based on the determined pets' emotions or feelings.

4. The system of claim 3 further comprising:
   means for learning pets' voices or body signals, collecting samples of pets' voices or body signals, and associating one or many pets' emotions or feelings to the collected samples; and
   means for training pets to use voices or body signals to convey their emotions and feelings.

5. A social network system for pets according to the present invention comprising:
   means for displaying or showing a pet one or many pictures or videos of one or many other pets;
   means for detecting and collecting the pet's voices or body signals;
   means for determining or measuring the pet's attitudes toward said other pets in the pictures or videos based on the detected voices or body signals or other facts or conditions; and
   means for performing one or many actions based on the determined or measured the pet's attitude to the other pets.

6. The social network system of claim 5 further comprising:
   means for storing one or many sample patterns of pets' voices or pets' body signals and the corresponding pets' attitude scales; and
   means for comparing the detected pet's voices or body signals with the stored sample patterns and determining or measuring the pet's attitude scales to the other pets in the picture or videos by choosing one or many sample patterns which are most closely matched to the detected pet's voices or body signals.

7. The social network system of claim 6 wherein the attitude scales are dislike very much, dislike, neutral, like, and like very much; the performing means display or show the pet more pictures or videos of the other pets if the determined or measured the pet's attitude scales are positive.

8. The social network system of claim 7 further comprising:
   a first composing unit for, based on the determined or measured pets' emotions or feelings or attitude scales, composing one or many graphics, videos, or animation videos, which can be understood by the other pets;
   a second composing unit for composing one or many texts or voice messages in a natural language based on the determined pets' emotions or feelings or attitude scales;
   a contact list unit for storing one or many set of contacts with screen names that represent other pets or people.

9. The social network system of claim 8, wherein
   each said contact in the contact list comprises a field for having a species type assigned or set.

10. The social network system of claim 9, wherein
    the species type is human, dog, cat, or bird;
    each contact with a dog species type comprises a direct or indirect references to his or her owners' screen names, IDs, or email addresses;
    each contact with a cat species type comprise a direct or indirect references to his or her owners' screen names, IDs, or email addresses;
    the performing means sends the composed graphics, videos or animation videos to the other pets in the contact list, and sends the composed text or voice messages to the other pets' owners in the contact list based on the determined attitude scales.

11. The social network system of claim 10 further comprising:

an event unit for finding or obtaining one or many events that may be interesting to the pet and showing the pictures or videos of the events to the pet;

a schedule unit for scheduling one or many events based on the pet's attitudes toward the pictures or videos of the events; and a matching unit for finding one or many matched pets to have a video bark or call from pet social networks.

12. The social network system of claim 11 further comprising:

a camera for monitoring the pet and taking pictures or videos of the pet;

a picture unit for selecting or editing one or many pictures taken by the camera 603 and sharing the pictures with other pets, their owners and other people;

an I/O unit for sending or receiving messages, images, pictures, videos, texts, voices, or other signals;

a first interpretation unit for interpreting the received messages, emails and controlling signals into voices' commands or image commands which can be understood by pets;

a second interpretation unit for interpreting and translating pets' voices and their body signals into natural languages which can be understood by pets' owners, and a video call unit for allowing pets and their owners to video call one or many other pets and their owners.

13. The social network system of claim 2, wherein the devices are light bulbs, and the controlling means controls the shapes, counts or colors of light bulbs based on the determined dogs' emotions or feelings.

14. A method of pets social networking comprising:

displaying or showing a pet of pictures or videos of other pets;

detecting or collecting the voices or body signals of the pet;

comparing the detected voices or body signals of the pet with the stored sample patterns and determining or measuring the pet's scales of the attitude toward the other pets in the pictures or videos;

displaying or showing the pet more pictures or videos of the other pets if the determined attitude scales are positive.

15. The method of 14, wherein the comparing further comprises:

comparing the detected voices or body signals of the pet with the stored sample patterns and determining the pet's emotions or feelings.

16. The method of 15, wherein the displaying or showing more pictures or videos further comprises:

composing graphics or videos based on the determined pet's emotions or feelings or the determined attitude scales, and sending the composed graphics or videos to the other pets.

17. The method of 16, wherein the displaying or showing more pictures or videos further comprises:

composing messages, emails, texts, or voice messages based on the determined pet's emotions or feelings or the determined attitude scales, and sending the composed messages, emails, texts or voice messages to the other pets' owners.

18. The method of 17, wherein the pet is a dog, cat, or bird, and the attitude scales are like, neutral or dislike.

19. The method of 17, wherein the pet is a dog, cat, or bird, and the attitude scales are like very much, like, neutral, dislike or dislike very much.

* * * * *